United States Patent
Yamada et al.

(10) Patent No.: US 7,227,323 B2
(45) Date of Patent: Jun. 5, 2007

(54) MOTOR DRIVING APPARATUS

(75) Inventors: Yuuichi Yamada, Yamanashi (JP); Shigeki Hanyu, Yamanashi (JP); Mamoru Yaeshima, Hadano (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/859,237

(22) Filed: Jun. 3, 2004

(65) Prior Publication Data
US 2004/0245952 A1   Dec. 9, 2004

(30) Foreign Application Priority Data
Jun. 6, 2003   (JP)   ............... 2003/162549

(51) Int. Cl.
*H02P 1/26* (2006.01)
*H02P 3/14* (2006.01)
*B66B 1/06* (2006.01)

(52) U.S. Cl. ...................... 318/376; 318/377; 187/290; 187/296

(58) Field of Classification Search ...................... None
See application file for complete search history.

(56) References Cited

U.S. PATENT DOCUMENTS

| | | | |
|---|---|---|---|
| 6,225,784 B1 | 5/2001 | Kinoshita et al. | |
| 6,333,611 B1 | 12/2001 | Shibuya et al. | |
| 6,335,870 B1 | 1/2002 | Sakurai | |
| 6,415,892 B2 * | 7/2002 | Araki et al. | 187/290 |
| 6,422,351 B2 * | 7/2002 | Tajima et al. | 187/290 |
| 6,431,324 B2 * | 8/2002 | Tajima et al. | 187/290 |
| 6,435,311 B2 * | 8/2002 | Araki et al. | 187/290 |
| 6,435,312 B2 * | 8/2002 | Tajima et al. | 187/290 |

(Continued)

FOREIGN PATENT DOCUMENTS

| | | |
|---|---|---|
| CN | 1267404 | 9/2000 |
| CN | 1353081 | 6/2002 |
| JP | 3-18285 | 1/1991 |
| JP | 06-343203 | 12/1994 |
| JP | 07-023535 | 1/1995 |
| JP | 08-251934 | 9/1996 |
| JP | 2000-141440 | 5/2000 |
| JP | 2000-236679 | 8/2000 |
| JP | 2001-95104 | 4/2001 |
| JP | 2001-320893 | 11/2001 |

OTHER PUBLICATIONS

Notice of Grounds of Rejection (Japanese Office Action) dated Jun. 14, 2005.
Chinese Office Action for Application No. 2004100462539; dated Apr. 28, 2006.
European Search Report for Application No. 04253318.2 dated Aug. 29, 2006.

*Primary Examiner*—Paul Ip
(74) *Attorney, Agent, or Firm*—Staas & Halsey LLP

(57) ABSTRACT

A motor driving apparatus applicable to various types of motor driving apparatuses and having a power storage section for storing a regenerative current and supplying power to an inverter section at the time of acceleration. The motor driving apparatus further comprises a converter section, a DC link, and an inverter section, thereby driving a motor. Connected to the DC link is the power storage section including a capacitor, a charging circuit, a discharging circuit and a diode. The regenerative current produced at the motor deceleration is stored in the capacitor through the diode. The power stored in the capacitor is outputted to the DC link by turning a switching element of the discharging circuit ON at the motor acceleration. Furthermore, the charging circuit has a boost switching regulator circuit for charging the capacitor to the given upper limit voltage equal to or larger than voltage of the DC link and a current limitation circuit for limiting a charging current to the given upper limit. The upper limit of the charging current can be changed according to the type of the motor driving apparatus.

7 Claims, 2 Drawing Sheets

U.S. PATENT DOCUMENTS

| | | | |
|---|---|---|---|
| 6,435,313 B2 * | 8/2002 | Tajima et al. | 187/290 |
| 6,439,347 B2 * | 8/2002 | Suga et al. | 187/290 |
| 6,439,348 B2 * | 8/2002 | Tajima et al. | 187/290 |
| 6,454,053 B2 * | 9/2002 | Tominaga et al. | 187/290 |
| 6,457,565 B2 * | 10/2002 | Tominaga et al. | 187/290 |
| 6,471,013 B2 * | 10/2002 | Banno et al. | 187/290 |
| 6,768,284 B2 * | 7/2004 | Lee et al. | 318/808 |
| 7,042,178 B2 * | 5/2006 | Yamada et al. | 318/376 |
| 7,106,023 B2 * | 9/2006 | Ota et al. | 318/803 |
| 2001/0008195 A1 * | 7/2001 | Tajima et al. | 187/290 |
| 2001/0017235 A1 * | 8/2001 | Suga et al. | 187/290 |
| 2001/0017239 A1 * | 8/2001 | Tajima et al. | 187/290 |
| 2001/0017242 A1 * | 8/2001 | Tajima et al. | 187/296 |
| 2001/0017243 A1 * | 8/2001 | Tajima et al. | 187/296 |
| 2002/0053490 A1 * | 5/2002 | Banno et al. | 187/290 |
| 2002/0157882 A1 | 10/2002 | Kubo et al. | |
| 2004/0035646 A1 * | 2/2004 | Araki | 187/290 |
| 2004/0245951 A1 * | 12/2004 | Yamada et al. | 318/376 |

* cited by examiner

MOTOR DRIVING APPARATUS

BACKGROUND OF THE INVENTION

1. Field of the Invention

The present invention relates to a motor driving apparatus, and more specifically to a motor driving apparatus which stores regenerative power in a deceleration of a motor and discharges the stored power in an acceleration of the motor.

2. Description of the Related Art

In a motor driving apparatus, a great driving current runs for acceleration during the motor acceleration (powering) period, and a regenerative current is produced during the deceleration period. Therefore, the motor driving apparatus has to be designed in consideration of a peak current in the motor acceleration (power running) period, resulting in increased size and cost of the apparatus. Moreover, the regenerative current generated in the deceleration period is thermally consumed by a regenerative resistor, resulting in wasted energy loss.

As a countermeasure for solving the above problems, there is known an invention in which a capacitor is connected to a converter (rectification circuit) section for converting an AC power into a DC power, an inverter section for converting the DC power into the AC power to drive an AC motor, and a DC link that links the converter (rectification circuit) section to the inverter section. An electric power stored in the capacitor is supplied to the inverter section in the acceleration period, and a regenerative power is stored in the capacitor in the deceleration period, so as to equalizing a driving current and avoiding a waste of the regenerative current (refer to JP 2000-141440A).

It is effective for the miniaturization and laborsaving of the motor driving apparatus to provide the capacitor to store the regenerative power therein and supply the power from the capacitor to equalize the driving current during the motor acceleration period while keeping the capacitor voltage at a given value as described in the above JP 2000-141440A. On the other hand, however, the capacitor needs to be charged to the given voltage, and charging the capacitor requires a dedicated transformer and converter (rectification circuit). There is an idea of using the converter section of the motor driving apparatus both as a converter section and a converter (rectification circuit) and thus configuring the charging circuit of the capacitor at low cost. If the converter section of the motor driving apparatus is utilized by way of charging the capacitor, however, the performance (charging current) of charging the capacitor is determined by the performance of the converter (rectification circuit) section of the motor driving apparatus. This forces the development of a large number of charging circuits according to the type of the motor driving apparatus, thereby raising the development cost.

SUMMARY OF THE INVENTION

The present invention provides a motor driving apparatus having a power storage section capable of storing a regenerative electric power in a decelerating drive of an AC motor and supplying stored power to an inverter section a in accelerating drive of the AC motor, irrespective of a type of the motor driving apparatus.

A motor driving apparatus of the present invention comprises: a converter section for rectifying and converting an alternating current from the AC power source into a direct current; an inverter section connected to the AC motor and converting the converted direct current into an alternating current to drive the AC motor; a DC link for connecting the converter section and the inverter section; a driving controller for controlling an operation of the inverter section in accordance with control signals from a host controller; and a power storage section connected to the DC link, for storing regenerative electric power in a decelerating drive of the AC motor and discharging the stored electric power in an accelerating drive of the AC motor, the power storage section having an interface with the host controller or the driving controller so that upper limits of charging current/voltage are changeable in accordance with data inputted through the interface.

The motor driving apparatus may further comprise a memory storing specifications of the motor driving apparatus, and the specifications read from the memory by the host controller or the driving controller may be inputted to the power storage section through the interface so that the upper limit of the charging current of the power storage section is set in accordance with the inputted data of specifications.

The power storage section may comprise a capacitor, a charging circuit for charging the capacitor by voltage of the DC link, a diode for charging the capacitor with the regenerative electric power in the decelerating drive of the AC motor and a discharging circuit for discharging the electric power stored in the capacitor in the accelerating drive of the AC motor.

The charging circuit may include a boost switching regulator for raising the voltage of the DC link and charging the capacitor to the upper limit of the charging voltage, a current limiting circuit for limiting the charging current to the upper limit thereof, and charging current/voltage adjusting means for adjusting the upper limit of the charging voltage and the upper limit of the charging current to the boost switching regulator and the current limiting circuit, respectively, in accordance with the inputted data of specifications.

DETAILED DESCRIPTION OF THE PREFERRED EMBODIMENTS

Figure 1:
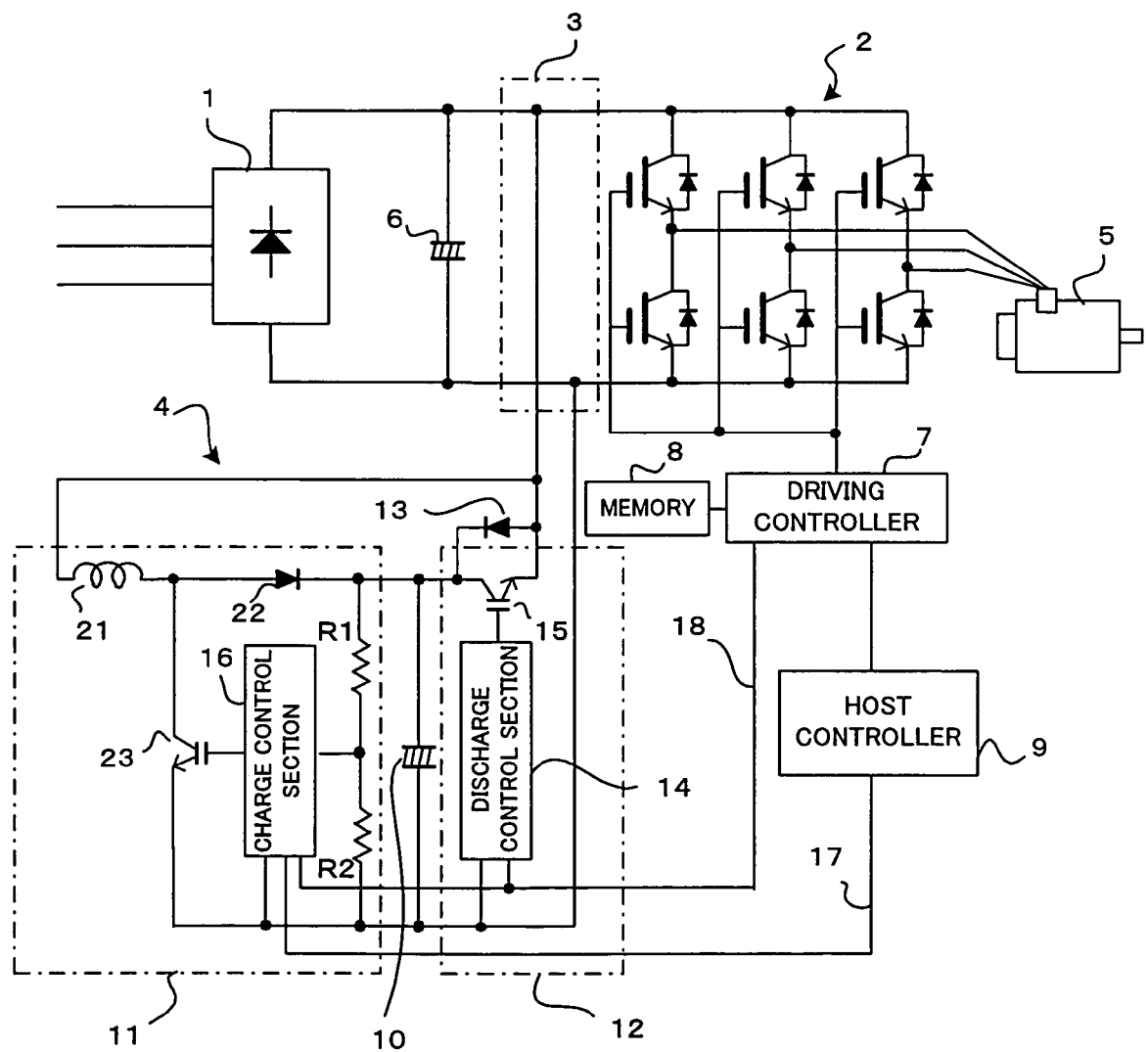
FIG. 1 is a block circuit diagram of a motor driving apparatus according to one embodiment of the present invention.

FIG. 1 is a block circuit diagram of a motor driving apparatus according to one embodiment of the present invention. In FIG. 1, a reference numeral 1 denotes a converter (rectification circuit) section for converting a three-phase alternating-current power source into a direct-current power source, and a reference numeral 2 represents an inverter section for reconverting the direct-current power source into the alternating-current power source to drive an ac motor 5. The converter section 1 and the inverter section 2 are connected to each other by a DC link 3, and direct current is supplied from the converter section 1 to the inverter section 2. The inverter 2 carries out ON/OFF control on switching elements of the inverter section 2 by using a driving controller 7 to supply the voltage of the direct-current power source to the motor 5, thereby driving the motor 5.

The driving controller 7 is a controller built into the motor driving apparatus, which performs the ON/OFF control on the switching elements of the inverter section 2, based on a command from a host controller 9, such as a numerical controller, for controlling the motor driving apparatus. Especially in this embodiment, a memory (such as ROM) 8 is connected to the driving controller 7. The memory 8 stores specifications of the motor driving apparatus, that is, information for specifying the unit, which includes a product name, production number, date of manufacture, etc.

A reference numeral 6 is a smoothing condenser for smoothing direct current output of the converter section 1. The converter section 1, the inverter section 2, the DC link 3, the driving controller 7 and the like are the same as those included in a conventional motor driving apparatus, and detailed descriptions thereof will be omitted.

According to the present invention, a power storage section 4 is connected to the DC link 3. The power storage section 4 has a capacitor 10 composed of a condenser and the like, a charging circuit 11 for charging the capacitor 10 with power a discharging circuit 12 for supplying power from the capacitor 10 through the DC link 3 to the inverter section 2, and a diode 13 for charging the capacitor 10 with a regenerative current. The charging circuit 11 and the discharging circuit 12 are connected to each other by the driving controller 7 and an interface section 18.

In the charging circuit 11, a switching element 23 is controlled by a charge control section 16, to thereby increase voltage of the DC link 3 through a reactor 21 and a diode 22 to charge the capacitor 10. More specifically, as described later, the charging circuit 11 is constructed from a boost switching regulator circuit 20, a current limitation circuit 30, and charging current/voltage adjustment means 40.

When the motor 5 starts to be accelerated, the discharging circuit 12 turns a switching element 15 ON using a discharge control section 14, based on a signal from the driving controller 7, to supply the power stored in the capacitor 10 to the DC link 3, thereby supplying a great driving current to the motor 5 through the inverter section 2.

The diode 13 causes the regenerative current, which is produced when the motor 5 is decelerated, to flow into the capacitor 10 through the DC link 3 to store power in the capacitor 10.

Figure 2:
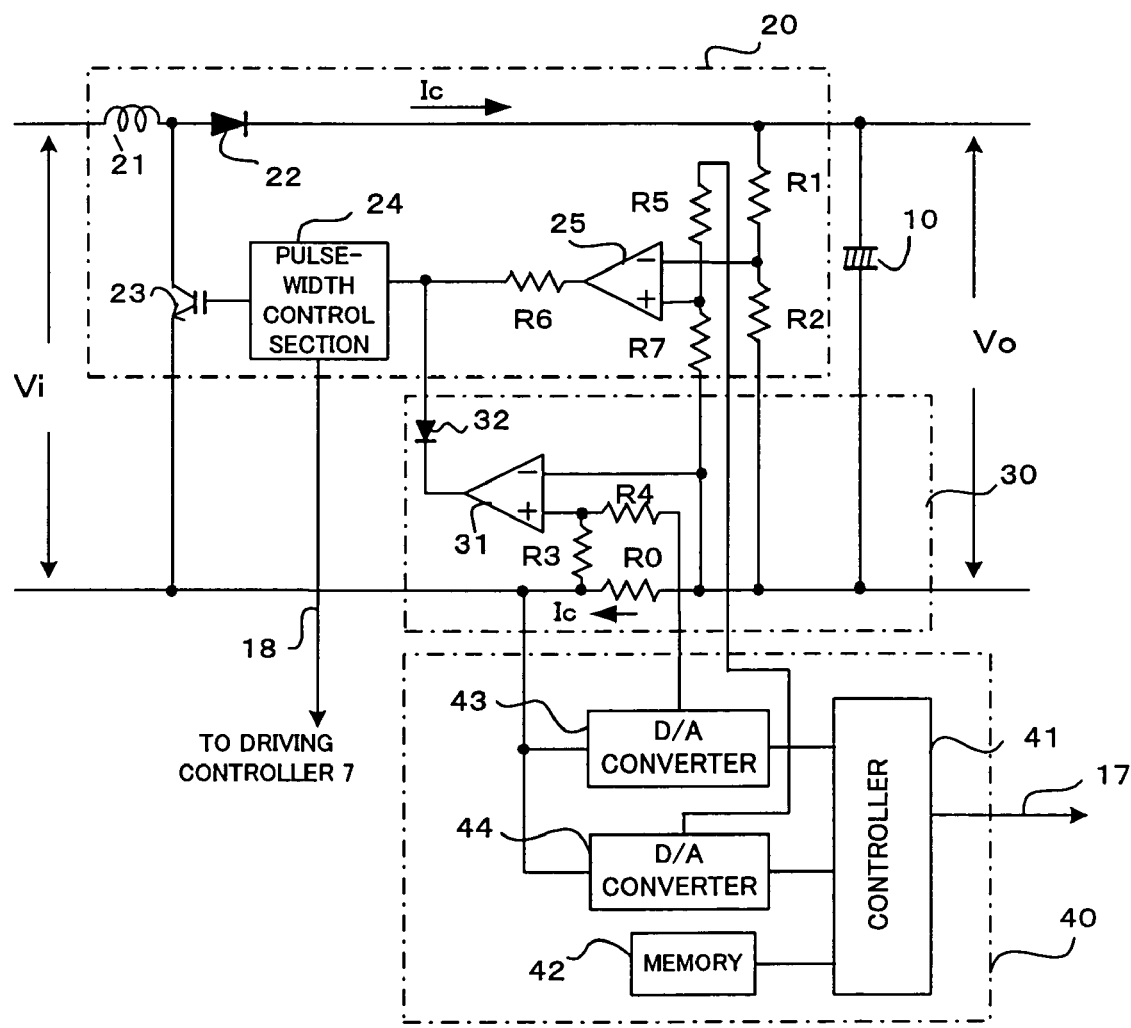
FIG. 2 is a detail block circuit diagram of a capacitor and a charging circuit according to the same embodiment.

FIG. 2 is a detail circuit diagram of the charging circuit 11.

The boost switching regulator circuit 20 is constructed from the reactor 21, the diode 22, the switching element 23, a pulse-width control section 24, a differential amplifier 25, and resistances R1, R2, R5, R6 and R7. The differential amplifier 25 amplifies difference between divided voltage obtained by dividing the charging voltage of the capacitor 10 using the resistances R1 and R2 and voltage obtained by dividing voltage outputted from a D/A converter 44 mentioned later using the resistances R5 and R7, thereby outputting a value obtained by the amplification to the pulse-width control section 24. The pulse-width control section 24 is connected to the driving controller 7 via the interface section 18 and controlled to be operable in response to a signal from the driving controller 7.

The driving controller 7 outputs a signal when the switch is turned ON in the motor driving apparatus and also when regenerative operation is finished, to thereby make the pulse-width control section 24 operable. In a state where the pulse-width control section 24 is operable in response to the signal from the driving controller 7, the pulse-width control section 24 outputs a signal having controlled pulse width and carries out ON/OFF control on the switching element 23. When the switching element 23 is ON, energy is stored in the reactor 21. When the switching element 23 is OFF, the energy is discharged to charge the capacitor 10. Due to a feedback circuit of the resistances R1, R2 and R6, the differential amplifier 25 and the pulse-width control section 24, output voltage of the charging circuit 11, or charging voltage of the capacitor 10, is controlled to be constant.

The output voltage of the charging circuit 11, namely charging voltage Vo of the capacitor, is expressed as in the following equation (1):

$$Vo = Vi \times (Ton + Toff)/Toff \qquad (1)$$

where Vi is input voltage (DC link voltage) of the charging circuit 11, Ton is ON time of the switching element 23, and Toff is OFF time thereof.

For instance, when equations, Ton=5 µs, Toff=15 µs, are satisfied, the output voltage Vo is boosted up to be approximately one point three times as high as the input voltage Vi. In this way, the capacitor 10 is charged by the voltage higher than the DC link voltage converted into direct current by the converter section 1.

When the charging voltage of the capacitor 10 is on the rise, the divided voltage obtained by being divided by the resistances R1 and R2 also increases, whereas the output voltage of the differential amplifier 25 decreases. As a result, the ON time Ton which is outputted from the pulse-width control section 24 becomes short, which hinders the rise of the charging voltage. On the contrary, when the charging voltage of the capacitor 10 falls, the output voltage of the differential amplifier 25 rises, and the ON time Ton which is outputted from the pulse-width control section 24 becomes long, which hinders the drop of the charging voltage. Eventually, given voltage is maintained.

At the start of the charge on the capacitor 10, however, great in-rush current flows into the capacitor 10. Therefore, in order to prevent the converter (rectification circuit) section 1 from being damaged, the charging circuit 11 is further provided with the current limitation circuit 30. The current limitation circuit 30 is constructed from a differential amplifier 31, a diode 32, and resistances R0, R3 and R4.

A D/A converter 43 mentioned later outputs a certain voltage (for example represented by V). The voltage V is divided by the resistances R4 and R3, and a result of a formula, the voltage V×R3/(R3+R4), is inputted to the differential amplifier 31. Inputted to the other end terminal of the differential amplifier 31 is voltage equal to an amount of a voltage drop in the resistance R0, which is caused by a charging current Ic for the capacitor 10. If the voltage equal to the amount of the voltage drop caused by the charging current exceeds the divided voltage V×R3 (R3+R4), the output of the differential amplifier 31 is reduced.

As stated above, when the output voltage (charging voltage of the capacitor 10) rises, the feedback circuit of the output voltage of the boost switching regulator circuit 20 operates to decrease the output voltage by reducing the output of the differential amplifier 25 and narrowing the pulse width of the ON time Ton outputted from the pulse-width control section 24. Accordingly, a reduction in the output of the differential amplifier 31 decreases the voltage inputted to the pulse-width control section 24 through the diode 32. This narrows the pulse width of the ON time Ton and decreases the output voltage, thereby making constant the voltage drop in the resistance R0, which is caused by the charging current Ic. As a result, the in-rush current which flows at the start of charge on the capacitor 10 is controlled and adjusted to a given upper limit.

A maximum acceptable value of the charging current Ic and that of the charging voltage are determined by capacity of the converter (rectification circuit) section 1 of the motor driving apparatus and different depending on the type of a motor control unit. Therefore, in the present embodiment, there is provided charging current/voltage adjustment means 40 for controlling the charging current Ic at a value equal to or smaller than a current value which is acceptable in the converter (rectification circuit) section 1 of the motor driving apparatus and keeping the charging voltage at a value equal to or smaller than the given upper limit, according to the type of the motor control unit.

The charging current/voltage adjustment means 40 comprises a controller 41, a memory 32, and D/A converters 43 and 44. The memory 42 stores information of the acceptable current value and maximum charging voltage value according to the type of the motor driving apparatus.

In case that the motor driving apparatus is replaced with another one, the host controller 9, such as a numerical controller, for controlling the motor driving apparatus reads specifications (information for specifying the motor driving apparatus) of the motor driving apparatus, which are stored in the memory 8 located in the motor driving apparatus, through the driving controller 7. The host controller 9 then transmits the information to the controller 41 located in the charging current/voltage adjustment means 40 through an interface 17. Based on the transmitted specification of the motor driving apparatus, the controller 41 reads information of the acceptable current value and that of the maximum charging voltage value from the memory 42. The controller 41 transmits the information of the acceptable current value to the D/A converter 43, and the information of the maximum charging voltage value to the D/A converter 44. A D/A converter 43 outputs voltage based on the information of the acceptable current value and inputs voltage, which is obtained by dividing the above voltage by the resistances R3 and R4, to the differential amplifier 31. Moreover, the voltage based on the information of the maximum charging voltage value is outputted from the D/A converter 44, and voltage determined by the resistances R5 and R7 is inputted to the differential amplifier 25.

This as mentioned above automatically limits the charging current and the charging voltage to have respective values equal to or smaller than the current value and voltage value, respectively, which are acceptable in the converter (rectification circuit) section 1 of the motor driving apparatus.

According to the above-described embodiment, the host controller 9 reads out the specification data stored in the memory 8 and outputs the same to the controller 41. However, the specification may be read from the memory 8 by the driving controller 7 provided to the motor driving apparatus, without using the host controller 9, to directly transmit the information to the controller 41 of the charging circuit.

The present invention can be configured at low cost since the regenerative current is stored at the time of motor deceleration, and at the time of motor acceleration, the converter section of the motor driving apparatus is utilized without an extra rectification circuit or the like for the discharging capacitor. Furthermore, since the maximum value of the charging current on the capacitor is set to an optimum value according to the rectification performance of the converter section of the motor driving apparatus, the invention is applicable to various types of motor driving apparatuses and also to existing motor driving apparatuses.

What is claimed is:

1. A motor driving apparatus for driving an AC motor using regenerative electric power as well as electric power from an AC power source, comprising:
   a converter section rectifying and converting an alternating current from the AC power source into a direct current;
   an inverter section connected to the AC motor and converting the converted direct current into an alternating current to drive the AC motor;
   a DC link connecting said converter section and said inverter section;
   a driving controller controlling an operation of said inverter section in accordance with control signals from a host controller;
   a power storage section connected to said DC link, storing regenerative electric power in a decelerating drive of the AC motor and discharging the stored electric power in an accelerating drive of the AC motor, said power storage section having an interface with the host controller or said driving controller so that upper limits of charging current/voltage are changeable in accordance with data inputted through said interface from the host controller or the driving controller; and
   a memory storing specifications of the motor driving apparatus,
   wherein upper limits of charging current/voltage of said power storage section are set in accordance with the specifications read from said memory and inputted through the interface.

2. A motor driving apparatus according to claim 1, wherein the host controller reads the specifications from said memory and inputs the specifications to said power storage section through the interface so that the upper limit of the charging current of said power storage section is set in accordance with the inputted specifications.

3. A motor driving apparatus according to claim 1, wherein said driving controller reads the specifications from said memory unit and inputs the specifications to said power storage section through the interface so that the upper limit of the charging current of said power storage section is set in accordance with the inputted specifications.

4. A motor driving apparatus according to claim 1, wherein said power storage section comprises a capacitor, a charging circuit charging said capacitor by voltage of the DC link, a diode charging said capacitor with the regenerative electric power in the decelerating drive of the AC motor and a discharging circuit discharging the electric power stored in said capacitor in the accelerating drive of the AC motor.

5. A motor driving apparatus according to claim 4, wherein said charging circuit includes a boost switching regulator raising the voltage of the DC link and charging said capacitor to the upper limit of the charging voltage, a current limiting circuit limiting the charging current to the upper limit thereof, and charging current/voltage adjusting means for adjusting the upper limit of the charging voltage and the upper limit of the charging current to said boost switching regulator and said current limiting circuit, respectively, in accordance with the inputted data of specifications.

6. A method for driving an AC motor using regenerative electric power as well as electric power from an AC power source, comprising:
   rectifying and converting an alternating current from the AC power source into a direct current;
   converting the converted direct current into an alternating current to drive the AC motor;

driving the AC motor using the alternating current converted from direct current; and charging a capacitor of a power storage section with regenerative electric power in the decelerating drive of the AC motor and discharging the electric power stored in the capacitor in the accelerating drive of the AC motor;

wherein regenerative electric power is stored in the power storage section in which upper limits of charging current/voltage are changeable in accordance with data inputted by either a host controller or a driving controller.

7. A method for driving a motor with a motor driving apparatus, comprising:

rectifying and converting an alternating current from the AC power source into a direct current;

converting the converted direct current into an alternating current to drive the AC motor;

driving the motor using the alternating current converted from direct current; and charging a capacitor of a power storage section with regenerative electric power in the decelerating drive of the AC motor and discharging the electric power stored in the capacitor in the accelerating drive of the AC motor;

wherein regenerative electric power is stored in the power storage section and a charging current is controlled at a value equal to or less than a current value acceptable in a converter section of the motor driving apparatus, based on transmitted specifications of the motor driving apparatus.

* * * * *